United States Patent [19]

Kurakake et al.

[11] Patent Number: 4,680,518

[45] Date of Patent: Jul. 14, 1987

[54] SERVOMOTOR VELOCITY CONTROL METHOD

[75] Inventors: Mitsuo Kurakake, Hino; Keiji Sakamoto; Yukio Toyosawa, both of Hachioji, all of Japan

[73] Assignee: Fanuc Ltd., Yamanashi, Japan

[21] Appl. No.: 908,701

[22] PCT Filed: Jan. 11, 1986

[86] PCT No.: PCT/JP86/00010

§ 371 Date: Sep. 8, 1986

§ 102(e) Date: Sep. 8, 1986

[87] PCT Pub. No.: WO86/04194

PCT Pub. Date: Jul. 17, 1986

[30] Foreign Application Priority Data

Jan. 12, 1985 [JP] Japan .................. 60-003702

[51] Int. Cl.$^4$ .................. G05B 13/00
[52] U.S. Cl. .................. 318/561; 318/615; 318/433
[58] Field of Search .............. 318/561, 615, 616, 617, 318/618, 433, 432

[56] References Cited

U.S. PATENT DOCUMENTS

| | | | |
|---|---|---|---|
| 4,366,422 | 12/1982 | Rhodes | 318/616 X |
| 4,491,776 | 1/1985 | Veale | 318/615 X |
| 4,498,037 | 2/1985 | Razaui | 318/561 |

*Primary Examiner*—Benjamin Dobeck
*Attorney, Agent, or Firm*—Staas & Halsey

[57] ABSTRACT

A servomotor velocity control system according to the present invention control velocity by using an observer for obtaining a sensed value of velocity while estimating motor load torque. When resolution of a rotary encoder is a problem in a region of low motor velocities, this is compensated for to improve the velocity sensing precision in the low-velocity region. In a region of high motor velocities, velocity processing is executed based on the output of the rotary encoder considering the processing time of a CPU. Use or non-use of the observer for obtaining the estimated value of velocity is selected in dependence upon the velocity of the motor.

2 Claims, 5 Drawing Figures

SERVOMOTOR VELOCITY CONTROL METHOD

TECHNICAL FIELD

This invention relates to a method of controlling the velocity of a servomotor for driving a load such as a machine tool or industrial robot.

BACKGROUND ART

When subjecting the velocity of a servomotor to feedback control, it is necessary to sense the actual velocity of the motor. To this end, conventional practice is to use a rotary encoder, by way of example. The rotary encoder is adapted to generate from several thousand to 20,000 pulses per revolution of the motor, the frequency of these output pulses being proportional to the rotational velocity of the motor.

Accordingly, the spacing between adjacent output pulses becomes very wide and the pulses become discrete in nature, especially when the servomotor rotates at a low velocity. When these pulses are used as motor rotation information in digital control, irregular rotation is the result.

Thus, when a rotary encoder for sensing the position of a mechanical load is used for sensing the velocity of a servomotor, velocity resolution is poor in comparison with an analog sensor and highly precise, smooth velocity control cannot be carried out.

DISCLOSURE OF THE INVENTION

An object of the present invention is to provide a servomotor velocity control method, in which when velocity is estimated based on position information from a rotary encoder, load torque such as Coloumb friction, which is a cause of a steady-state estimating error, is estimated at the same time to obtain an estimated value of velocity, and in which an observer (estimating unit) is used for obtaining the estimated value of velocity, use or non-use of the observer is selected in dependence upon the motor velocity, thereby lightening the burden on a central processing unit (CPU).

According to the present invention, there is provided a servomotor velocity control method in which position information from a rotary encoder mounted on a servomotor driving a mechanical load is fed back and a torque command signal is produced for application to the servomotor. The method comprises steps of comparing a reference velocity set for the servomotor and the motor velocity, calculating an estimated value of load torque when the motor velocity is less than the reference velocity, calculating an estimated value of velocity of the servomotor based on position information from the rotary encoder, motor current of the servomotor and the estimated value of load torque, and calculating the torque command signal based on the estimated value of velocity and a velocity command signal.

The servomotor velocity control method of the invention is such that when velocity is sensed by using the observer for obtaining the estimated value of velocity while the motor load torque is estimated, use or non-use of the observer is selected in dependence upon the motor velocity. This lightens the burden on the central processing unit (CPU) and enables velocity to be sensed accurately in a low-velocity region.

BEST MODE FOR CARRYING OUT THE INVENTION

An embodiment of the present invention will now be described in detail with reference to the drawings.

Figure 2:
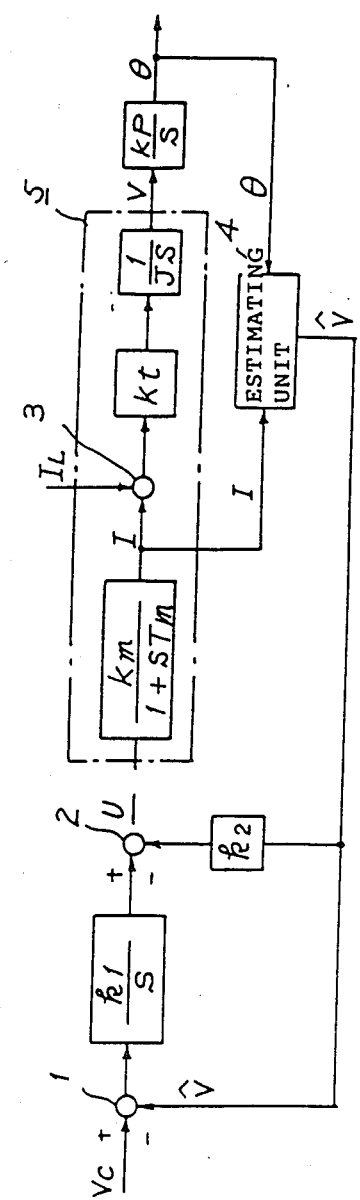
FIG. 2 is a block diagram of a control circuit to which the velocity control method of the present invention can be applied.

FIG. 2 is a block diagram of a velocity control method according to the present invention. Numerals 1 through 3 denote arithmetic units, 4 an estimating unit (observer) and 5 a motor. $V_c$ represents a velocity command, U a torque command signal, I motor current and $I_L$ current indicative of a load torque. V represents the velocity of the motor, $\theta$ a position signal, $k_1$ integration gain, $k_2$ feedback gain, $K_m$ a motor constant, and $T_m$ a ratio between $L_a$ and $R_a$, namely the value of $L_a/R_a$, where Ra denotes motor winding resistance and La represents inductance. Further, $K_t$ is a torque constant, J stands for inertia which is the total of the load and motor inertia, and $K_p$ is a conversion coefficient decided by the rotary encoder. S represents d/dt. Further, the estimating unit per se is one commonly in use. A velocity control method in which a velocity sensor is combined with the estimating unit has been proposed in Japanese Patent Application No. 59-55114.

The operation of this velocity control system will now be described.

First, the arithmetic unit 1 produces an output indicative of the difference between the velocity command Vc and an estimated value of velocity, described below. The output signal is integrated and then applied to the arithmetic unit 2. The result of multiplying the estimated value $\hat{V}$ of velocity by the feedback gain $k_2$ is applied to the arithmetic unit 2, which outputs the difference between its two input signals as the torque command U, thereby controlling the motor 5. The velocity of the motor is outputted as V, and a position signal $\theta$ is sensed by a rotary encoder. The position signal $\theta$ includes load torque information, since the current $I_L$, which is indicative of the load torque (Coulomb friction), is added thereto at the arithmetic unit 3.

In such a velocity control method, the estimated value V of velocity is obtained by using the observer 4. At this time the load torque, which is a cause of a steady-state estimating error, is estimated simultaneously. Specifically, the position signal 0, which takes into account the motor current I and the current $I_L$ indicative of load torque, is applied to the observer 4, which proceeds to output the estimated value $\hat{V}$ of velocity.

Let us describe this point in detail. If an identity observer is constructed for the motor current I, motor velocity V, position signal $\theta$ and current $I_L$ representative of load torque, we will have $$\begin{pmatrix} \dot{\theta} \\ \dot{V} \\ \dot{i}_L \end{pmatrix} = \begin{pmatrix} 0 & K_P & 0 \\ 0 & 0 & -\frac{K_t}{J} \\ 0 & 0 & 0 \end{pmatrix} \begin{pmatrix} \theta \\ V \\ I_L \end{pmatrix} + \frac{K_t}{J} \begin{pmatrix} 0 \\ 1 \\ 0 \end{pmatrix} I$$

What are actually sensed and applied to the observer 4 are the motor current I and position signal $\theta$. An identity observer for digital processing is as follows:

$$\begin{pmatrix} \hat{\theta}_{n+1} \\ \hat{V}_{n+1} \\ \hat{I}_{Ln+1} \end{pmatrix} = \begin{pmatrix} 1-\lambda_1 & K_PT & \frac{-K_PK_t}{2J}T^2 \\ -\lambda_2 & 1 & \frac{-K_t}{J}T \\ -\lambda_3 & 0 & 1 \end{pmatrix} \begin{pmatrix} \hat{\theta}_n \\ \hat{V}_n \\ \hat{I}_{Ln} \end{pmatrix} +$$

$$\begin{pmatrix} \lambda_1 \\ \lambda_2 \\ \lambda_3 \end{pmatrix} \theta + \frac{K_t}{J} \begin{pmatrix} \frac{K_P}{2}T^2 \\ T \\ 0 \end{pmatrix} I$$

where T is a sampling period and $\lambda_1, \lambda_2, \lambda_3$ are gains of the observer 4. These values are set in inverse proportion to time needed for the estimated value to converge to a true value.

In order to process the above by a microprocessor, the observer 4 is implemented by the following algorithm:

$$\left. \begin{array}{l} \Delta\hat{\theta}_{m+1} = \lambda_1 \sum_{j=0}^{m}(\Delta\theta_j - \Delta\hat{\theta}_j) + K_PT\hat{V}_m + \frac{K_PK_T}{2J}T^2(I_m - \hat{I}_{Lm}) \\ \hat{V}_{m+1} = \hat{V}_m + \lambda_2 \sum_{j=0}^{m}(\Delta\theta_j - \Delta\hat{\theta}_j) + \frac{K_tT}{J}(I_m - I_{Lm}) \\ \hat{I}_{Lm+1} = \hat{I}_{Lm} + \lambda_3 \sum_{j=0}^{m}(\Delta\theta_j - \Delta\hat{\theta}_j) \end{array} \right\} \quad (1)$$

Figure 3:
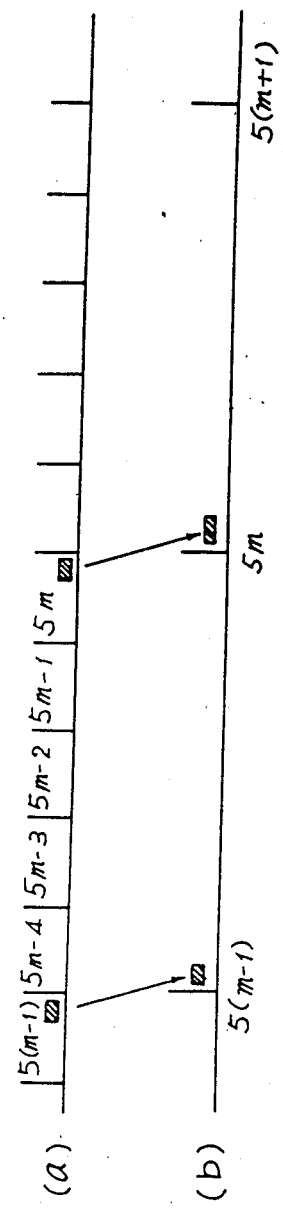
FIG. 3(a) is a view for describing a motor current loop processing level.
FIG. 3(b) is a view for describing a velocity processing level.

FIG. 3 is a view useful in describing information processing for obtaining the predicted value V of velocity. FIG. 3(a) is for describing the processing level (j) of a motor current loop, and FIG. 3(b) is for describing a velocity processing level (m).

The observer 4 is equipped with a counter for integrating a number of pulses $\Delta\theta$ which arrive from the rotary encoder at sampling times T. It is assumed that gains $\lambda_1, \lambda_2, \lambda_3$ which will bring an estimating error to zero within e.g. five periods are calculated and given in advance.

Figure 4:
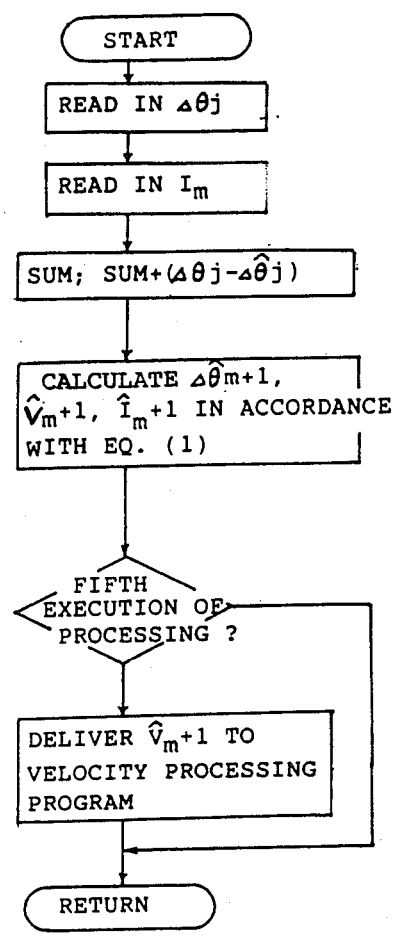
FIG. 4 is a flowchart illustrating observer processing at a motor current loop level.
Figure 5:
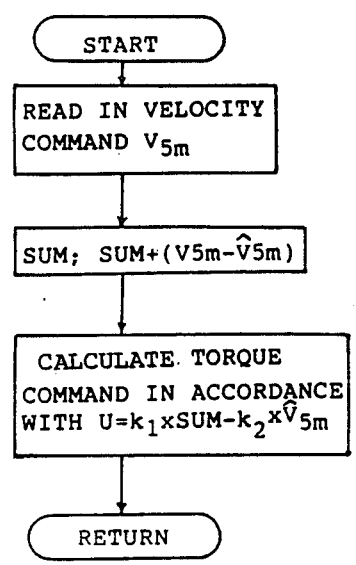
FIG. 5 is a flowchart illustrating velocity loop processing.

FIG. 4 illustrates a flowchart of processing performed by the observer at the motor current loop processing level. FIG. 5 illustrates a flowchart of velocity loop processing.

First, with regard to the motor current loop, the observer 4 reads in position information $\Delta\theta_j$ and motor current $I_m$. Next, these are integrated. Then, based on Eq. (1), position estimation information $_{66}\hat{\theta}_{m+1}$, velocity estimation information $\hat{V}_{m+1}$ and current estimation information $\hat{I}_{Lm+1}$ indicative of load are calculated. When this processing has been performed for the fifth time, $\hat{V}_{m+1}$ is delivered to a velocity procesing program. This relationship is evident from FIGS. 3(a) and 3(b).

Next, in velocity loop processing as indicated by the flowchart of FIG. 5, the observer 4 reads in velocity commands $V_{5m}$ and then integrates them. Next, the integrated value is multiplied by the integration gain $k_1$ and from this product is subtracted the product of velocity estimation information $\hat{V}_{5m}$ and feedback gain $k_2$, whereby the torque command $U_{5m}$ is obtained.

Figure 1:
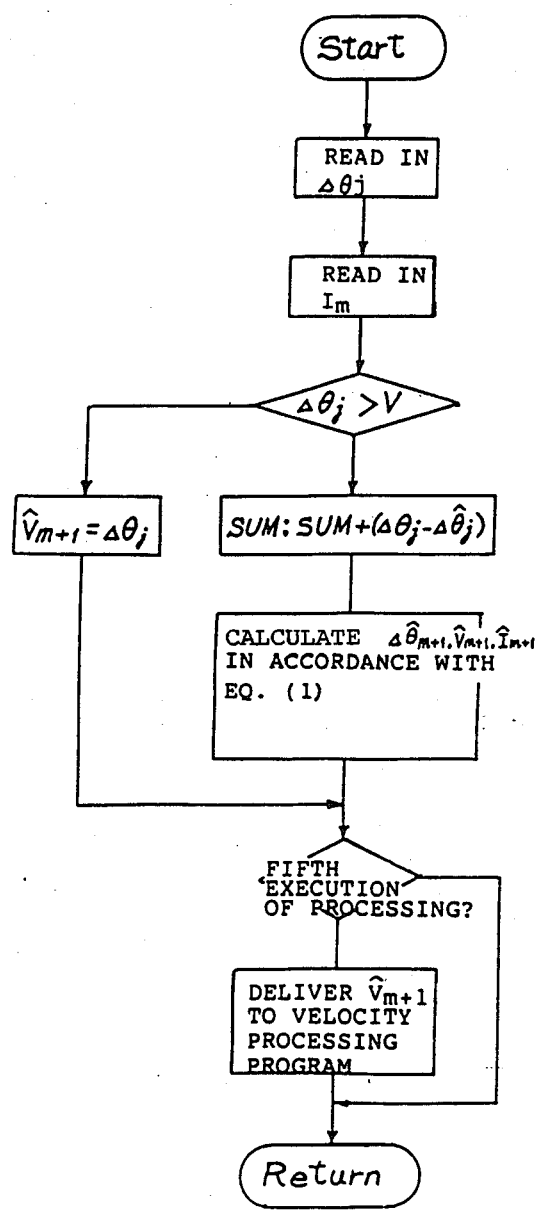
FIG. 1 is a flowchart illustrating observer processing at a motor current loop level according to the present invention.

FIG. 1 illustrates a flowchart of processing performed by the observer 4 at the motor current loop processing level according to the present invention. After the observer 4 reads in the position information $\Delta\theta_j$ motor current $I_m$, the position information $\Delta\theta_j$ and reference velocity $V_s$ are compared. When the motor velocity is greater than a fixed velocity, the present velocity is estimated based on pulses obtained from the rotary encoder and the estimated value of velocity is delivered to the velocity processing program to obtain a torque command without executing observer processing. In this point the processing differs from the flow of observer processing shown in FIG. 4, but in other respects the processing is identical.

When, say, 1500 rpm is selected as the reference velocity Vs and the sensed velocity is less than 1500 rpm, observer processing is executed so that low velocities can be sensed accurately.

The present invention is not limited to the above-described embodiment but can be modified in various ways within the scope of the claims.

INDUSTRIAL APPLICABILITY

The servomotor velocity control method according to the present invention makes possible highly precise velocity control even when a servomotor is driven at a low velocity. The invention is particularly well-suited to operating a machine tool bed or industrial robot, which require to be controlled in a highly precise manner.

We claim:

1. A servomotor velocity control method in which position information from a rotary encoder mounted on a servomotor driving a mechanical load is fed back and a torque command signal is produced for application to the servomotor, said method comprising the steps of:
   comparing a reference velocity set for said servomotor and the motor velocity;
   calculating an estimated value of load torque when the motor velocity is less than said reference velocity;
   calculating an estimated value of velocity of the servomotor based on position information from said rotary encoder, motor current of the servomotor and said estimated value of load torque; and
   calculating the torque command signal based on said estimated value of velocity and a velocity command signal.

2. A servomotor velocity control method according to claim 1, characterized in that said reference velocity is 1500 rpm.

* * * * *

UNITED STATES PATENT AND TRADEMARK OFFICE
CERTIFICATE OF CORRECTION

PATENT NO. : 4,680,518

DATED : July 14, 1987

INVENTOR(S) : Kurakake et al.

It is certified that error appears in the above-identified patent and that said Letters Patent is hereby corrected as shown below:

Front page, [73], "Yamamashi" should be --Minamitsuri--.

Col. 3, line 4 from the bottom, change "$66\hat{\theta}$ should be --$\hat{\Delta\theta}$--.

Signed and Sealed this

Twenty-sixth Day of April, 1988

*Attest:*

*Attesting Officer*

DONALD J. QUIGG

*Commissioner of Patents and Trademarks*